July 17, 1962   M. TEN BOSCH ETAL   3,044,304
ROTOR BALANCER
Filed June 24, 1953   9 Sheets-Sheet 1
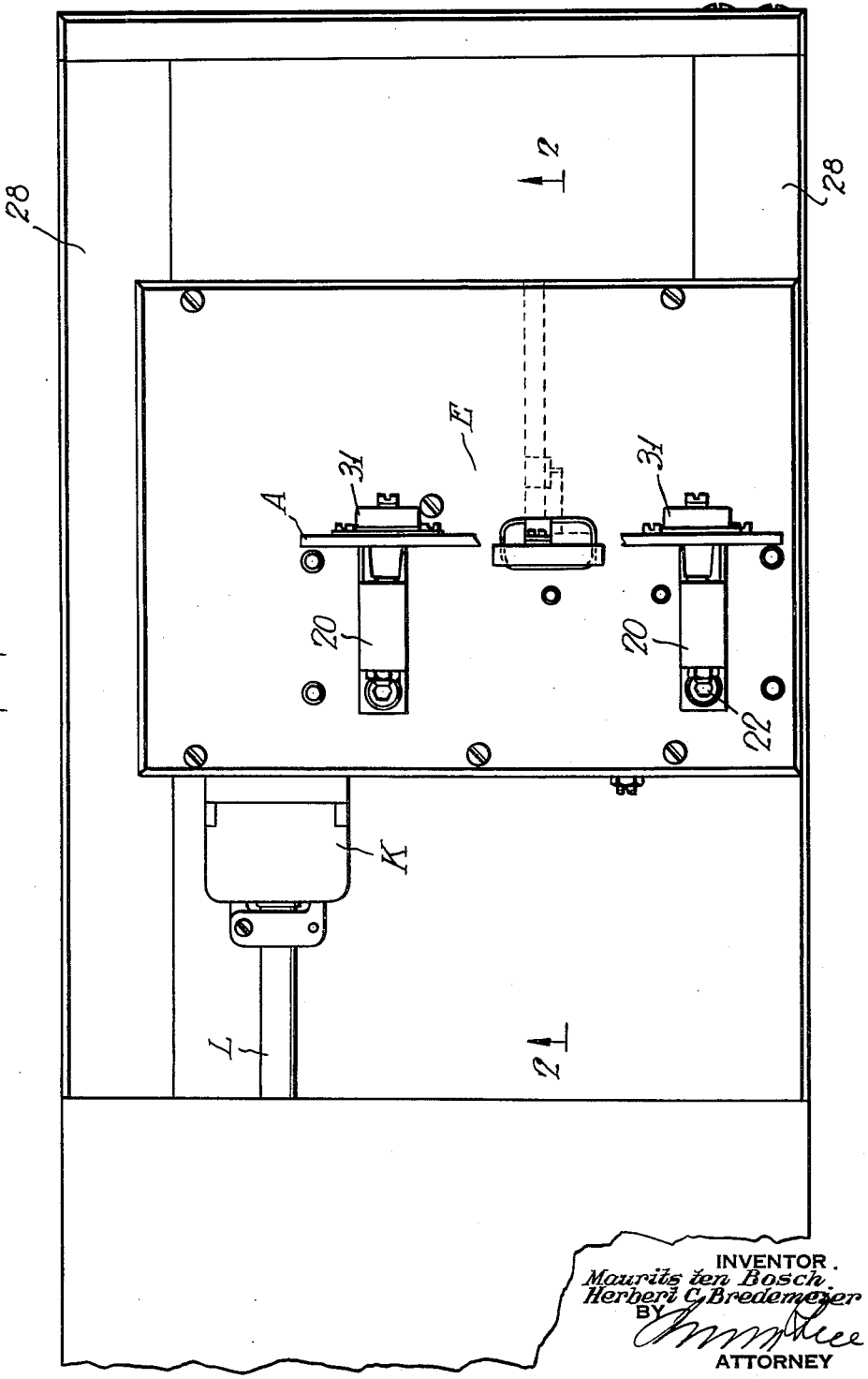
INVENTOR.
Maurits ten Bosch
Herbert C. Bredemeyer
BY
ATTORNEY

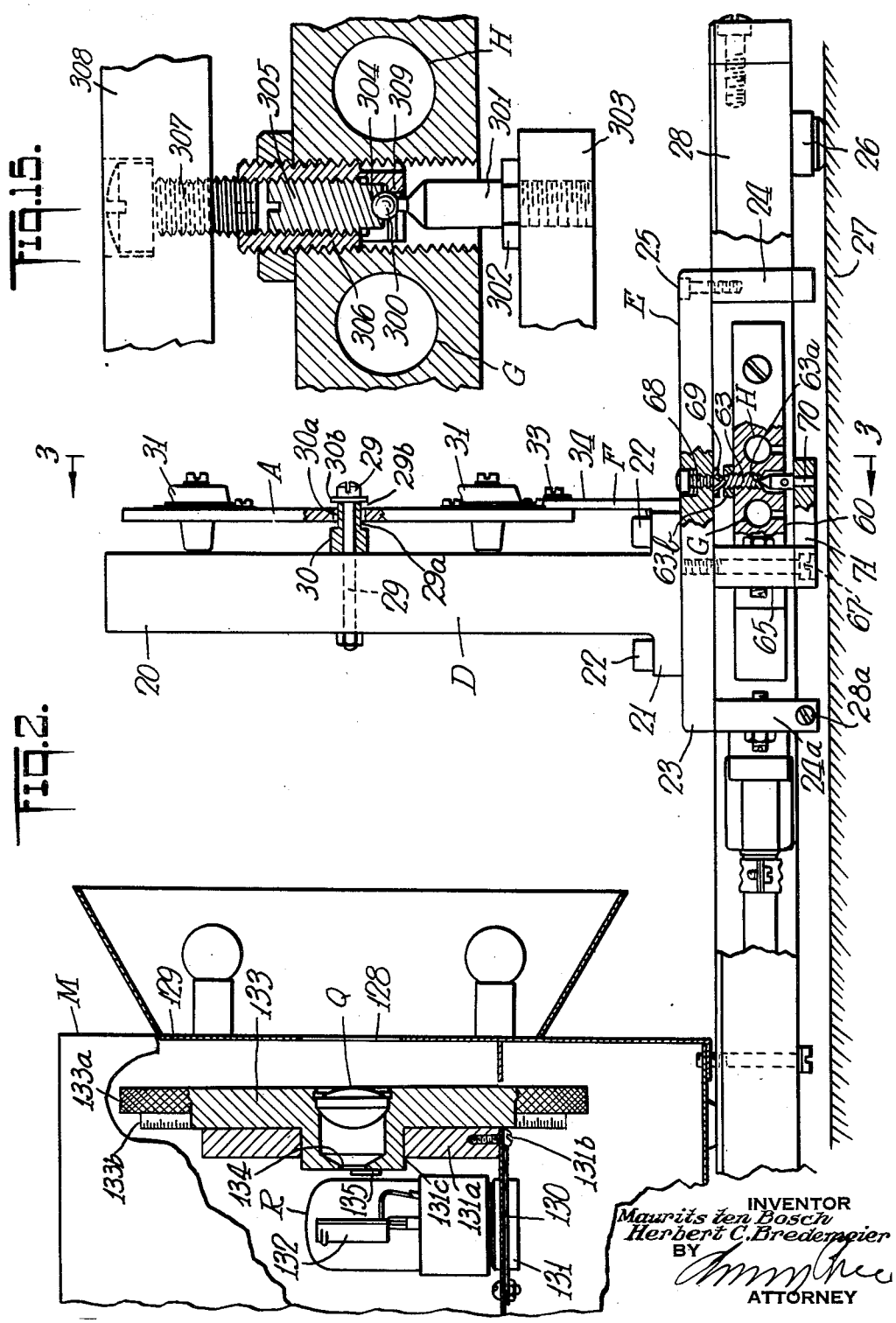

July 17, 1962  M. TEN BOSCH ETAL  3,044,304
ROTOR BALANCER
Filed June 24, 1953  9 Sheets-Sheet 3
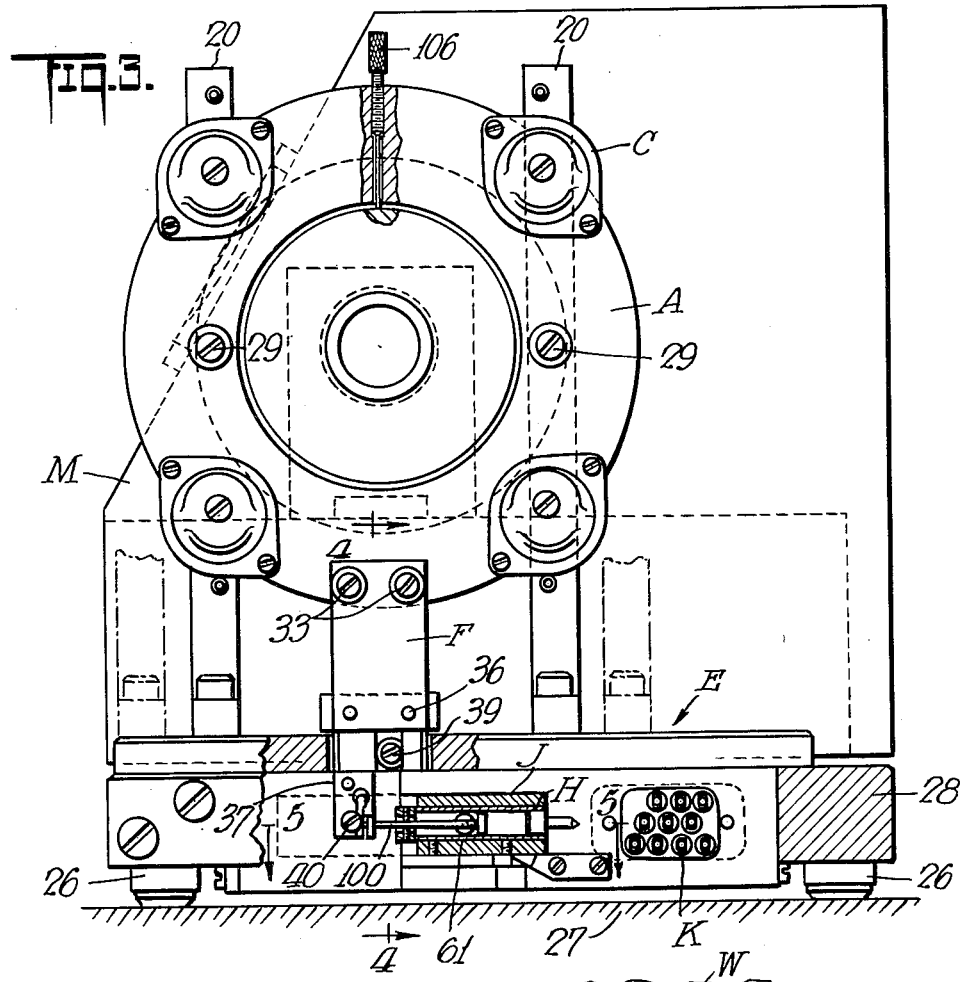
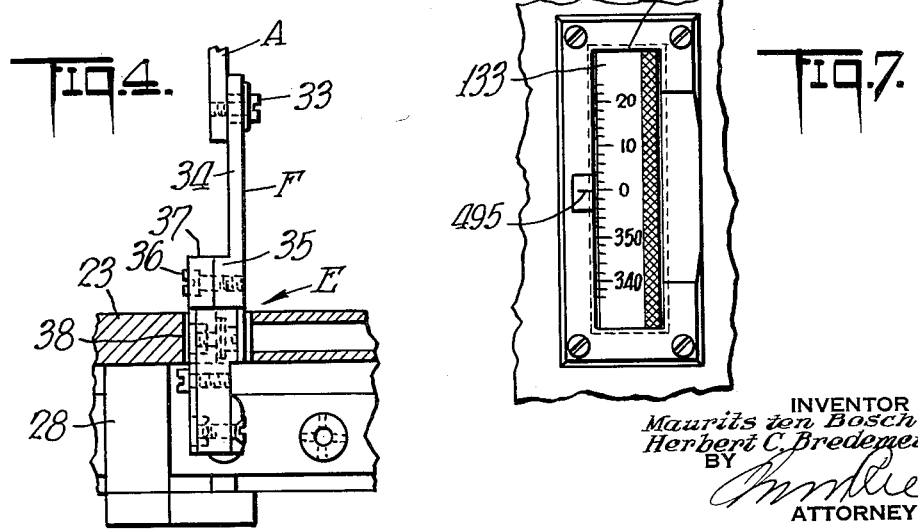
INVENTOR
Maurits ten Bosch
Herbert C. Bredemeier
BY
ATTORNEY July 17, 1962   M. TEN BOSCH ETAL   3,044,304
ROTOR BALANCER
Filed June 24, 1953   9 Sheets-Sheet 4

INVENTOR
Maurits ten Bosch
Herbert C. Bredemeier
BY
ATTORNEY

July 17, 1962
M. TEN BOSCH ETAL
3,044,304
ROTOR BALANCER
Filed June 24, 1953
9 Sheets-Sheet 5
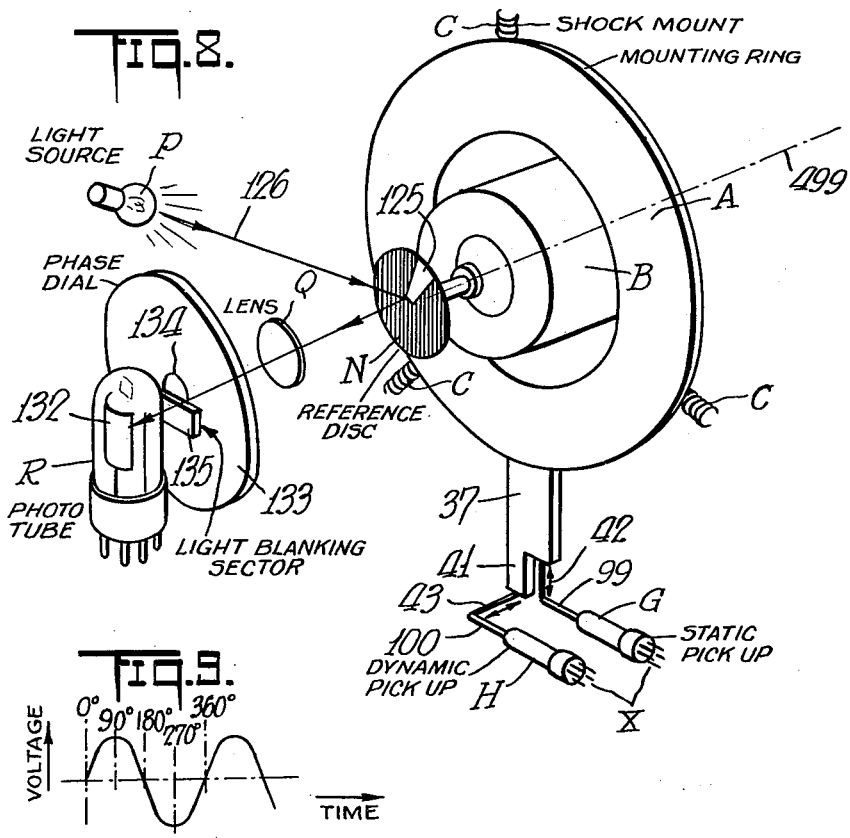
INVENTOR
Maurits ten Bosch
Herbert C. Bredemeier
BY
ATTORNEY

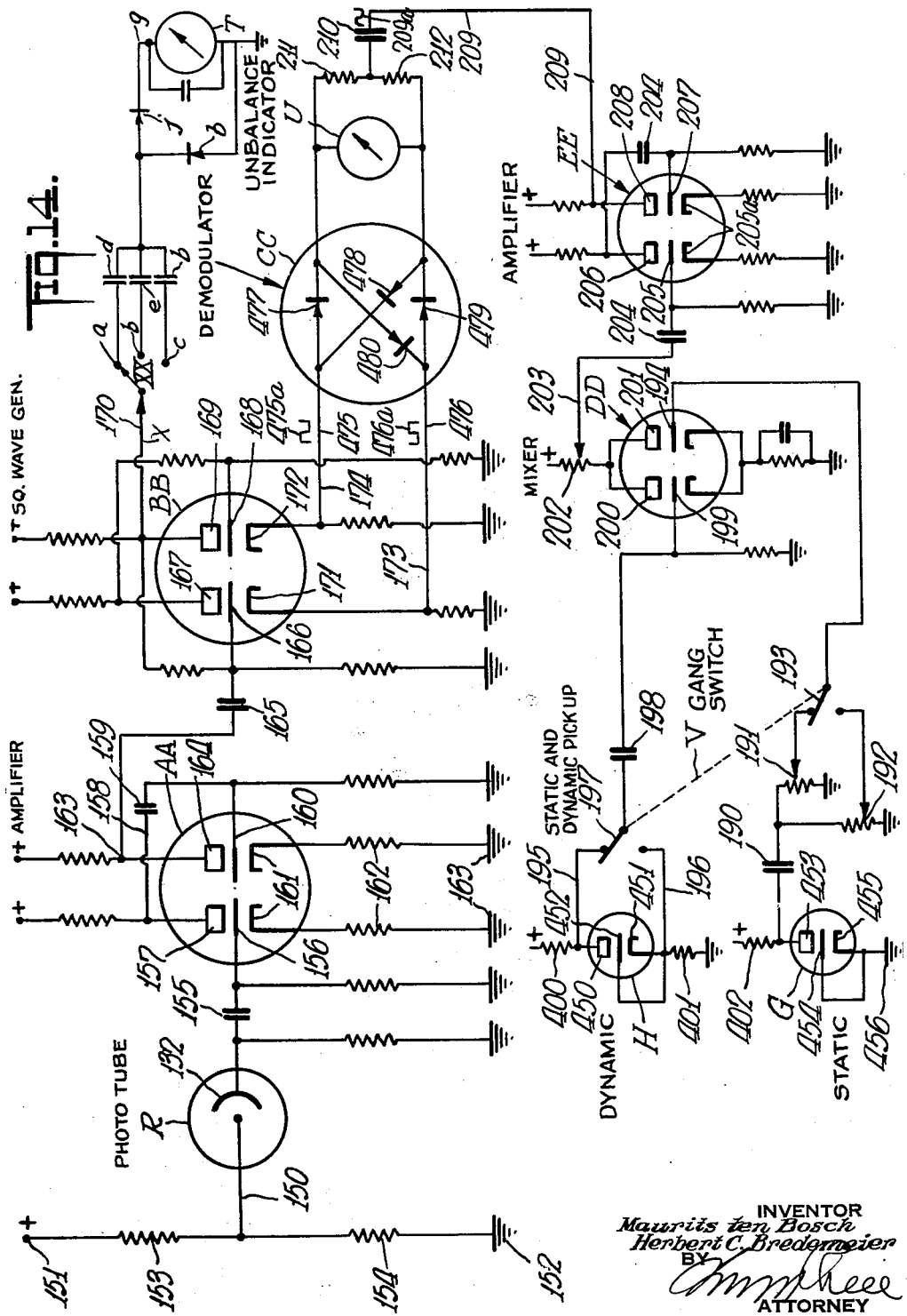

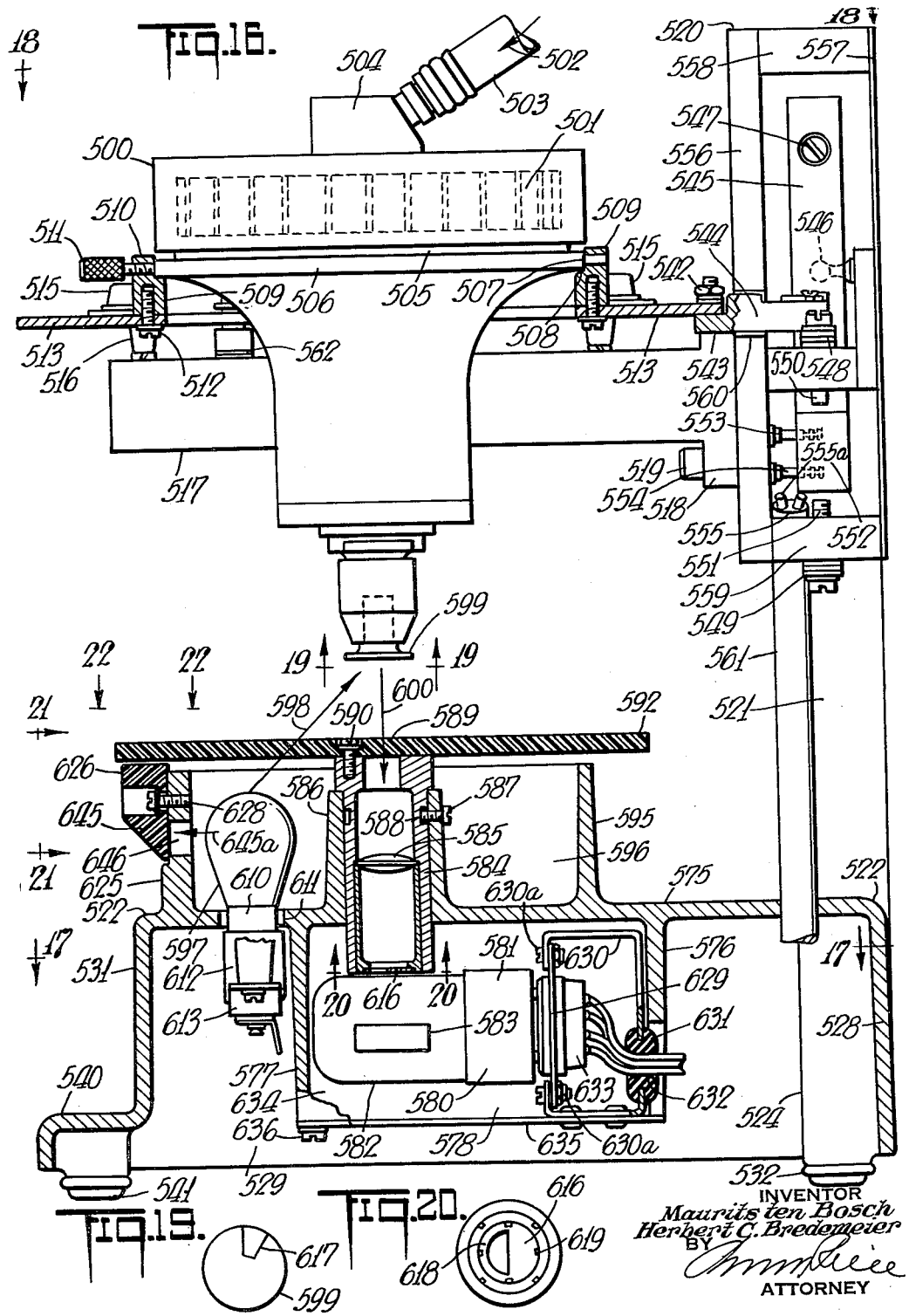

July 17, 1962   M. TEN BOSCH ETAL   3,044,304
ROTOR BALANCER
Filed June 24, 1953   9 Sheets-Sheet 8
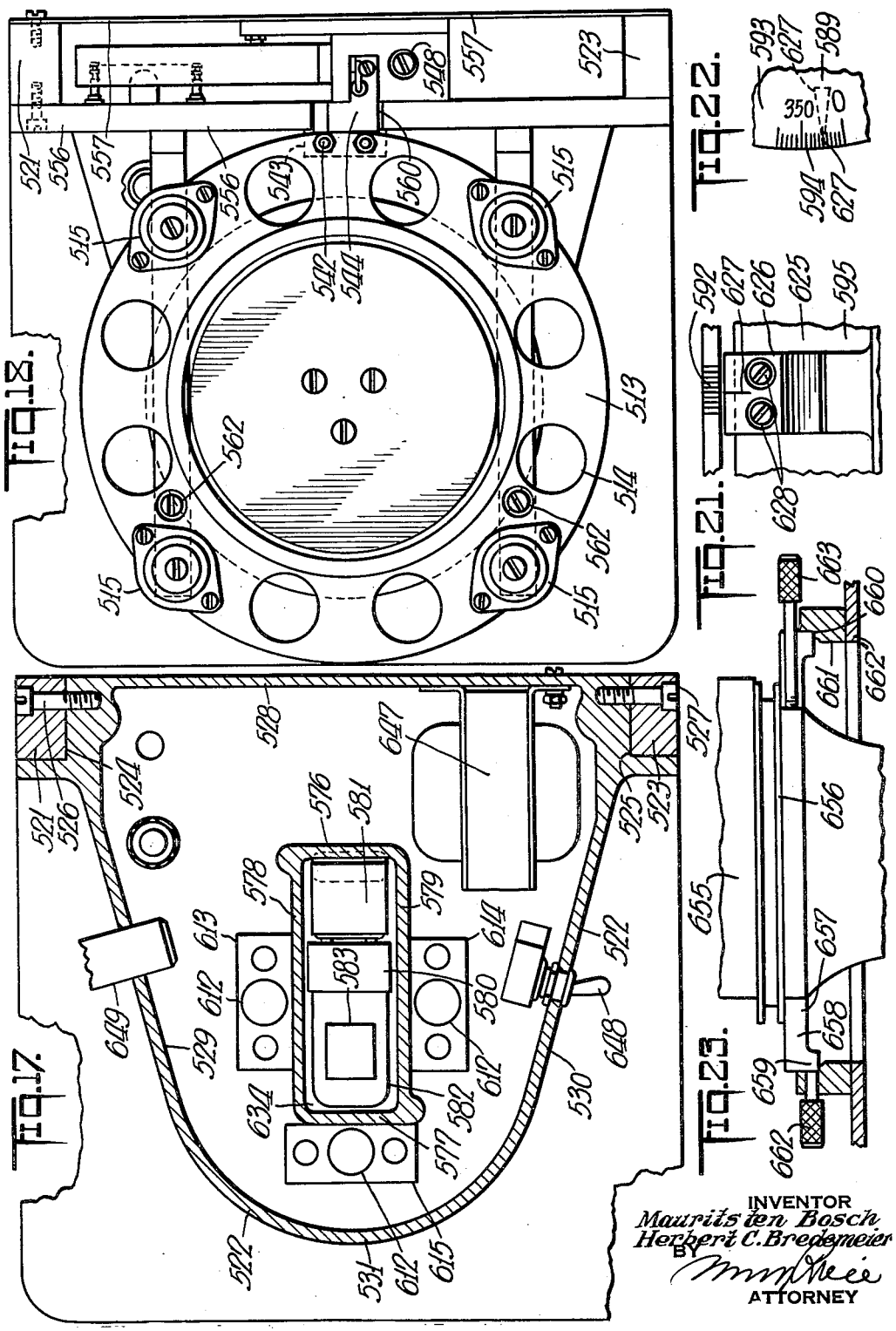
INVENTOR
Maurits ten Bosch
Herbert C. Bredemeier
BY
ATTORNEY

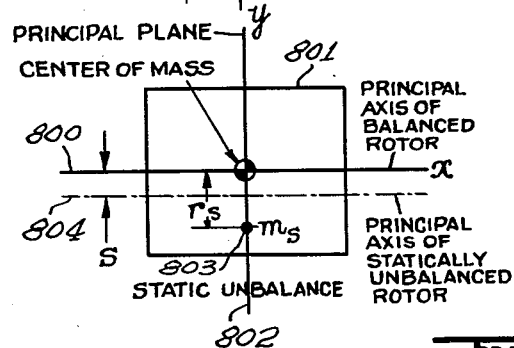
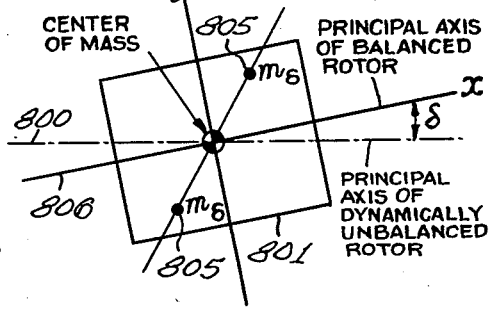
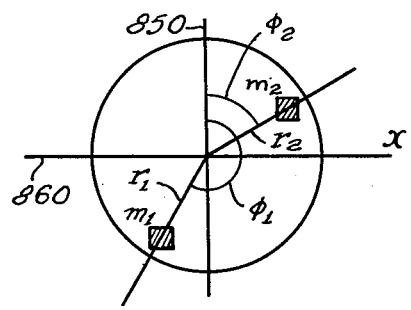
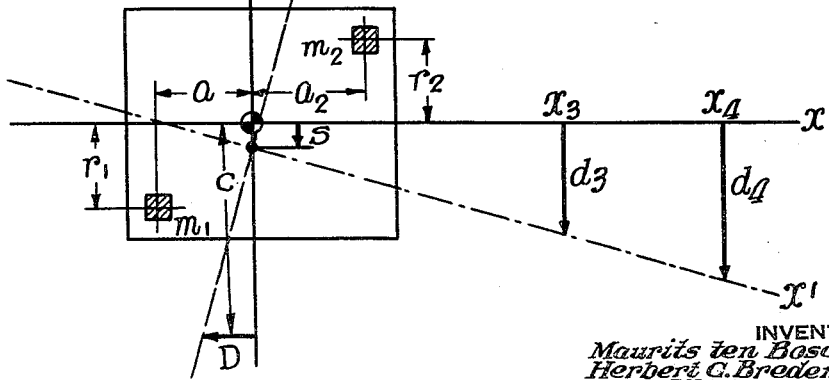

United States Patent Office 3,044,304
Patented July 17, 1962

3,044,304
ROTOR BALANCER
Maurits Ten Bosch, White Plains, and Herbert C. Bredemeier, Ossining, N.Y., assignors to M. Ten Bosch, Inc., Pleasantville, N.Y., a corporation of New York
Filed June 24, 1953, Ser. No. 363,866
22 Claims. (Cl. 73—462)

The present invention relates to a rotor balancer and it particularly relates to an instrument for detecting dynamic unbalance in high speed rotors.

Although the present invention will be particularly described in its application to determining unbalance in instrument type rotors such as those of gyroscopes used in aircraft and missile controls, it has a broad application in detecting and correcting unbalance in rotors generally.

It is among the objects of the present invention to provide a simple, sensitive instrument for detecting and enabling ready correction of dynamic unbalance which will be highly sensitive and will indicate even the smallest unbalance tending to cause excessive vibration, premature wear and increased maintenance particularly with high speed rotor elements such as are used in instruments and gyroscopes.

A further object is to provide an instrument for detecting and enabling correction of such dynamic unbalance which will not be complicated in operation, which may be readily applied to tiny armatures or other instrument type rotors with assurance that both dynamic and static unbalance will be accurately determined even with rotor vibrations of amplitudes of less than 10 millionths of an inch.

A further object is to provide a highly adaptable low cost easily installed and operated instrument for detecting unbalance, which will detect and locate and enable correction of very small amounts of unbalance and which will give direct and precise determination of both the magnitude and position of the unbalance.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

The present invention accomplishes determination of unbalance in high speed rotors enabling correction in two planes, usually the end planes of the rotor by separately measuring static and dynamic unbalance.

An electric computer is then provided to enable specific determinations of where the corrections are to be made to correct unbalance, desirably in the end planes of the rotor.

Only by measuring displacements corresponding to wobbling motion in the plane of the center of gravity can the effect of the dynamic unbalance and the static unbalance be separately determined with a single transmission.

Then the corrections to be made are determined by the electric computer for application to the rotor in two other planes.

However, to correct the unbalance in the rotor, it is necessary to add or remove material at the end planes of the rotor and not in the central plane or at least in a plane or planes substantially removed from the center.

The essential features of the present invention reside in the mounting of the rotor to be measured for unbalance in such a way that it is possible to determine the linear displacement resulting from static unbalance and the angular displacement resulting from dynamic unbalance. This is preferably, but not necessarily, done in a plane through the center of gravity.

With a rotor to be measured for unbalance, it is first necessary to determine the constants of the rotor. The mass must be determined, the center of gravity must be located. The planes of correction are determined by the shape of rotor and the position in which corrections are to be made, and their distance from the center of gravity measured.

Then the moments of inertia must be determined, one moment being the rotor moment about the spin axis and the other moment being the moment of inertia of rotor plus the housing, plus the mounting ring about an axis located in the plane of the mounting ring and passing through the center of gravity.

Basically, the rotor while spinning at high revolutional velocity is mounted on a mounting ring, which in turn is mounted on a fixed support by elastic supports, such as rubber shock absorbers or springs.

The natural frequency of the system including the shock absorbers and the mass which they support is low with respect to the frequencies at which the measurements are made, so that the effect will be as if the rotor is freely suspended in space.

Various types of pick-ups may be utilized to pick up the vibrations arising from static unbalance and dynamic unbalance. These pick-ups may consist of crystal elements, reluctance or capacitor arrangements or electromagnetic devices, but they preferably are vacuum tube elements.

It has been found most satisfactory, according to one specific embodiment of the present invention, to mount the rotor, preferably in a housing, and then provide that the static and dynamic unbalance will be separately detected by sensing the vibration of the mounting or carrier for the rotor, which will be transmitted to mechano-electronic transducers.

By static unbalance is meant that type of unbalance which causes a rotor to revolve or rotate about an axis parallel to but spaced from a geometrical axis, as will occur when the body rotates eccentrically. Dynamic unbalance on the other hand results from rotation about an axis oblique to the geometrical axis, which oblique axis will pass through the center of gravity. Generally, unbalance consists of both factors.

The signals which are picked up by these transducers are combined electronically and compared with a square wave reference voltage, which is derived from the spinning rotor whose unbalance is being determined.

It is desirable to obtain this square wave reference voltage from the rotor rotation without applying any load to the spinning rotor, and this is best done by a photo-electric sensing system, including a light-reflecting disc, a light-blanking unit, and a photo-electric tube.

In one form of the invention, a light-reflecting disc is mounted on the end of the shaft of said rotor and a light-blanking sector adjusts the phase of the light reaching the photo-electric tube from the unit. This photo-electric sensing system establishes a base voltage to which the unbalance voltage may be referred.

The instrument is designed so that it will have a variety of ranges, as for example a 1st range of giving an unbalance range of 0 to 300 milliounce-inches, with a 2nd range of 0 to 30 milliounce-inches, and a 3rd range of 0 to 3 milliounce-inches.

The instrument may also be provided with a series of rotor speed ranges, and, for example, it may measure rotational velocities ranging from 0 to 20,000, as well as 0 to 200,000.

In some instances the lowest range may be 0 to 2000.

Generally, the instrument will resolve the unbalance into two masses in the rotor, which may be located in spaced planes on opposite sides of the center of gravity and perpendicular to the spin axis.

A photo-electric system is most satisfactory for generating a square wave reference voltage without affecting the measurement of the static and dynamic unbalance. In many instances the photo electric system may be replaced by a mechanical commutator or a capacitive or inductive pick-up.

The present rotor balancer is unique in that both bearings of the rotor are supported rigidly in respect to one another, and also in that both bearings are supported upon a common mount.

This mount, in the structure set forth above, is mounted resiliently, so that it may move together with the rotor bearings.

On the other hand, the pick-ups are mounted in a carrier block which in turn is mounted so as to assume a fixed position during operation irrespective of vibrations of the rotor.

In the preferred form, the pick-ups are mounted in a block, which block in turn is mounted in the frame structure in such a way that it will assume a fixed position in space during the operation of the device.

The pick-up styli then will be subject to any movement of the mount because of either static or dynamic unbalance.

If the mount is stationary, with the rotor turning, it can be assumed that there is no unbalance.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a top plan view of the mechanical assembly of the rotor balancer in which the rotor is mounted or secured.

FIG. 2 is a side elevational view partly in section the section being upon the line 2—2 of FIG. 1 of the mechanical assembly with a part of the photoelectric sensing system.

FIG. 3 is a side elevational view partly in section upon the line 3—3 of FIG. 2.

FIG. 4 is a detailed vertical fragmentary sectional view upon an enlarged scale as compared to FIG. 3, showing the bracket which carries the vibrational displacement to the mechano-electronic transducers.

FIG. 7 is a fragmentary view of the phase indicator upon an enlarged scale as compared to FIG. 6.

FIG. 8 is a perspective diagrammatic view showing a photo-electric system together with a part of the mechano-electronic transducer system.

FIG. 9 is a schematic diagram of the composite voltage signal obtained from the transducers.

FIG. 10 is a schematic drawing illustrating the square wave of voltage obtained as an output from the photo-electric sensing system in phase with the voltage of FIG. 9 with the reading of unbalance being maximum in one direction.

FIG. 11 is a schematic diagram showing the square wave of voltage from the photo tube 180° out of phase with the voltage of FIG. 9 and with the reading of unbalance being maximum in the other direction.

FIG. 12 is a schematic diagram showing the square wave of voltage 90° out of phase either leading or lagging the voltage of FIG. 9, with the reading on the unbalance meter being zero, the solid line curve being lagging and the dotted line curve being leading.

FIG. 13 is a diagrammatic transverse longitudinal sectional view of a typical mechano-electronic transducer which may be utilized in connection with the instrument of FIGS. 1 to 6 and FIG. 8 to determine the static and dynamic unbalance.

FIG. 14 is a simplified circuit diagram of the electronic unit.

FIG. 15 is a diagrammatic side sectional view of an alternative pivot mounting for the block carrying the mechano-electronic transducers at the base of the mechanical assembly of the rotor balancer.

FIG. 16 is a side elevational view of an alternative embodiment where the axis of the rotor being balanced is maintained in vertical relationship to the horizontal and in which the rotor is positioned directly above the photo-electric system.

FIG. 17 is a transverse horizontal sectional view upon the line 17—17 of FIG. 16.

FIG. 18 is a transverse sectional view upon the line 18—18 of FIG. 16 looking downwardly.

FIG. 19 is a bottom plan view of the light reflecting disc which is positioned on the bottom of the rotor taken from the line 19—19 of FIG. 16.

FIG. 20 is a fragmentary transverse horizontal sectional view upon the line 20—20 of FIG. 16.

FIG. 21 is a fragmentary side elevational view of the graduated phase adjusting device upon the line 21—21 of FIG. 16.

FIG. 22 is a fragmentary side elevational view upon the line 22—22 of FIG. 16 showing the top edge of the phase adjustment device.

FIG. 23 is a fragmentary side elevational view indicating the positioning of the clamping screws upon the adaptor bearing ring.

FIGS. 24 to 27 are diagrammatic views illustrating the basic theory of the measurements of the instrument of the present invention.

Figure 5:
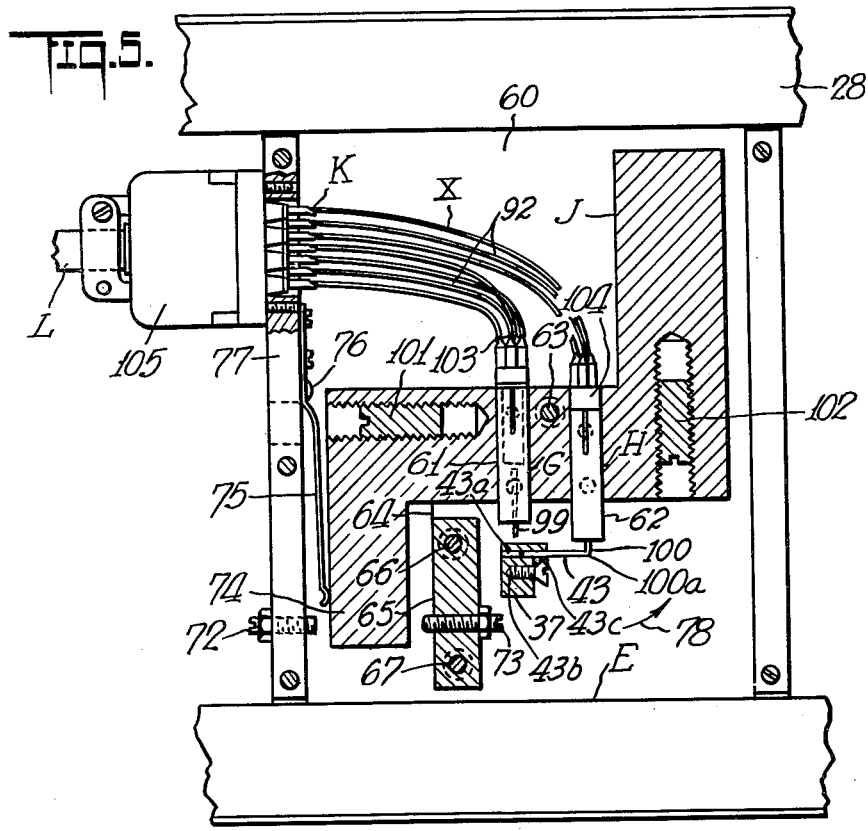
FIG. 5 is a fragmentary, horizontal, transverse sectional view upon the line 5—5 of FIG. 3.

Referring initially to FIGS. 1 to 6 and FIG. 8 there is shown a mounting ring A for carrying the casing B which may house the rotor of a gyroscope or small high speed motor.

This ring A is provided with a plurality of rubber shock mountings C—four in number being shown. These rubber shock mountings will permit vibration and provide equal elasticity in all directions. The rubber shock mountings will mount the ring A upon a rigid vertical frame D including the uprights 20. The frame D in turn is mounted upon a stand or base E.

The displacements of the mounting ring A will be transmitted by a transmission plate F to the static and dynamic mechano-electronic transducers G and H respectively. These transducers G and H are mounted within the pivotally mounted insulating plastic mass J.

The signals generated in the transducers G and H will be transmitted by flexible leads X to the electrical terminal system at K and then through suitable cable means L to the electronic unit M.

At the same time there will be transmitted to the electronic circuit a light signal to give rotor speed and a square wave reference voltage, said light signal being derived from the disc N. The disc N has a white portion which is illuminated by the source of the illumination P (see FIG. 8).

The photo-electric system will consist of the lens Q (see FIGS. 2 and 8) and the photo-electric tube R, and this will produce the square wave reference voltage S in FIGS. 10 to 12. This will be modified by electrical means to give indication of speed on the indicator T.

At the same time through the electrical circuit shown in FIG. 14 the unbalance will be indicated upon the galvanometer dial U in units of mass times distance, for example, milliounce-inches.

The switch V will enable the unbalance in different planes to be measured and the phase dial W will enable an adjustment of the phase by rotating the light blanking sector 135. The light blanking sector 135 is turned by rotating the phase dial 133 (see also FIGS. 6 and 7).

Referring to the circuit diagram of FIG. 14, the photo tube R and the static and dynamic transducers G and H will transmit the electrical information to the circuit necessary for the operation of the device.

The information from the photo tube is transmitted to the cascaded two single or one double triode amplifiers AA and then to the two single or one double triode square wave generators BB. Then it passes to the demodulator CC consisting of a germanium diode network 477, 478, 479 and 480.

From the static and dynamic transducers G and H the electrical information is transmitted to the two single or one double triode mixer DD which will add the dynamic and static signals both in amplitude and phase. From the mixer DD the information is transmitted to the two single or one double triode amplifier EE. It will be noted that both the square wave generator and the amplifier EE then transmit the information from the photo electric system and the transducers G and H to the unbalance meter circuit including demodulator CC and the meter U, which is also indicated in the instrument panel of FIG. 6.

In the present invention by a single mounting in a plane extending through the center of gravity it is possible to measure both the static and dynamic unbalance in such single plane through the center of gravity, and the resultant displacements are then converted electrically into separate indications of separate corrections in milliounce inches, which can be directly applied to the rotor body for correction purposes.

The mounting and measurement is independent of the speed and the measurement is of displacement rather than velocity.

Referring specifically to the rotor mounting as shown in FIGS. 1 to 5 the rigid upright support D consists of two vertical bars 20 which have flanged bases which are held in position by the bolts 22 upon the cross member 23.

The member 23 is mounted at its ends by the guide member 24. Upon loosening the screws or bolts 25 the mechanical assembly may be moved back and forth on the table 28.

The table member 28 has the legs 26 on the bench 27 (see FIG. 2).

The elements 28 are guide rails or ways on which the frame E is moved backwardly and forwardly. The screws 25 may be tightened or loosened either to clamp or permit adjustment of the frame E. The frame E carries the clamping member 24 which clamps the table E to the ways 28. There is a guide screw 28a below the way or guide rail 28. The adjustment will set the correct dimensions for the photo-electric system.

Mounted on the two upright bars 20 is the mounting ring A. The rubber vibration mounts 31 permit a vibratory movement of the ring A subject to the unbalance of the rotor which rotor may be placed between the bars 20 and inside of the ring A.

Figure 6:
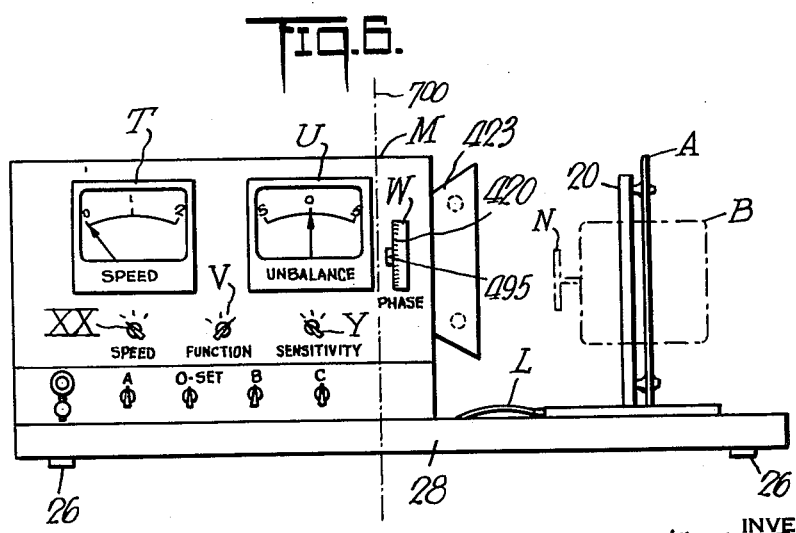
FIG. 6 is a front elevational view upon a small scale showing the instrument panel of the electronic unit and also showing the mechanical assembly of the rotor mounting upon a reduced scale as compared to FIGS. 1 to 5.

This rotor housing is shown in dotted lines at B in FIG. 6 and also is indicated diagrammatically in FIG. 8. The rotor housing B, which may receive a gyroscopic rotor, is suitably centrally mounted within the ring A as shown diagrammatically in FIG. 8.

In respect to the mounting means for the rotor housing on the ring A, there is clearance at 29a and 29b on each side of the mounting ring A. The fastening bolt 29 extends to and through the mounting structure 20 and it also etxends through the stepped metal sleeve 30 which is stepped down, as indicated at 30a, and has a disk 30b at the end thereof clamped in position by the head of the bolt 29. This stepped, metal sleeve 30 acts as a limit stop to limit the deflection or motion of the mounting ring and to protect the pick-ups from excessive deflection.

To the lower edge of the ring A by the screws 33 is connected the offset transmission plate F. This plate has the vertical section 34 and an offset 35. The offset 35 is bolted at 36 to the insulating extension 37 which passes downwardly through the opening 38 on the top plate 23 of the table 28. This extension is provided with a screw member 39 for connection of a wire to the static mechano-electronic transducer G and is also provided with the screw 40 upon the extension 37 which secures a wire connected to the dynamic mechano-electronic transducer H. These connecting wires are diagrammatically indicated at 42 and 43 in FIG. 8, which wires 42 and 43 are specifically connected to the extensions or styluses 99 and 100.

In the recess 60 in the table 28 is positioned the Z-shaped insulating plastic mass J which receives the transducers G and H. These transducers are fitted in casings and are permanently mounted by set screws in the cavities 61 and 62 as shown in FIG. 5.

The plastic Z shaped block J (see FIG. 5) is pivotally mounted at 63 between the arm 71 and the cross member or plate 23. The spacer 65 carries the arm 71 and in turn is mounted by the bolts 66 and 67 in the base 28.

The block J is mounted in the carrier 23—24 which is mounted on the base 28. The spacer 65 is mounted on the bar 23 of the carrier 23—24.

The pivot bearing screw 63 is adjusted vertically so that the pivot point 63a is located slightly above the center of gravity of block J. This will keep the natural period of oscillation of the block J far below the period of any oscillation which is to be measured. At the same time it will allow the block J to adjust itself to the neutral position of the mounting ring A.

The pivot bearing screw 63 is held between the lower plug 70 having a pivot bearing at its upper end and the screw 68. The screw 68 fits into the dimple 69 in the top of the screw 63. The screw 68 is used to secure the block J during transportation or shipping. The lock nut 63b secures the screw 63 after adjustment of the position of the pivot bearing 63a relative to position of center of gravity of mass J. The lock nut 63b permits locking of the adjustment screw 63. The base plug 70 is mounted in the plate 71.

In the alternative form of FIG. 15 a ball pivot 300 is provided mounted at the top of the post 301. The post 301 is held by the hex nut 302 on the base mounting plate 303. The ball 300 is recieved in the socket 304 at the bottom of the adjustable screw plug 305. The screw plug 305 is inserted into the sleeve 306 in a Z shaped plastic block J between the transducers G and H. Above the sleeve 306 is the clamping screw 307 in the plate or platform 308. The ball 300 is held in position at the socket 304 at the bottom of the screw plug 305 and the inward extension 309 at the bottom of the threaded sleeve 306.

The screw 307 of FIG. 15, is a shipping screw and it is removed so as to free the block J for movement about the ball 300. The ball 300 of FIG. 15 functions the same as the single point pivot 63 indicated in FIG. 2. In FIG. 2 the screw 68 is also a shipping screw and like the screw 307 of FIG. 15 is retracted in operation.

The block J cooperates with adjustable stops 72 and 73 which limit movement of the block J by contacting the extensions 74 thereof.

The leaf spring 75 mounted at 76 (see FIG. 5) on the wall portion 77 will tend to bias the block J in the direction indicated by the arrow 78. The spring 75 may be omitted if desired.

The mechano-electronic transducers G and H shown in larger scale in FIG. 13, consist of a metal tubular envelope 90 which is mounted upon a glass base 91 provided with the electrical leads 92 extending therethrough.

The shell 90 encloses a grid 92a, a cathode 93, an internal shield 94 and the plate 95. The plate structure 95 is connected to the shell 90 through diaphragm 96. Internally there is provided the getter 98 which will take up any residual air.

The styluses 99 and 100 are fastened to the plate shaft 97.

The triode transducer of FIG. 13, when suitably connected, will transform any mechanical vibration coming into the tubes G and H from the shaft 97 into the plate 95 into electrical signals.

In a typical application a deflection sensitivity of 40 volts per degree deflection of the plate shaft 97 may be obtained.

The displacement of the shaft 97 will change the distance between the cathode 93 and the plate 95 with resultant change in the plate current.

There is soldered to the end of the shaft 97 the extensions 99 on the static pick-up transducer G and 100 on the dynamic transducer H. The wire connections 42 and 43 will respectively transmit to the plates 95 through the extensions or styluses 99 and 100 the static and dynamic vibration of the rotor which is being rapidly rotated in the housing B.

The adjustable balancing slugs 101 and 102 are provided in the plastic block J as shown in FIG. 5 to balance the mass J on the pivot points 63 or 300 of FIGS. 2 and 15.

The base connection ends 103 and 104 have suitable flexible wiring 92 leading to the terminal block K as shown in FIG. 5 where they pass into the plug member 105. From 105 the electrical signals or indications are passed through the cable L to the electronic unit M.

The flexible wiring X which connects to the transducer leads 92 has sufficient flexibility so as not to impose any appreciable restraint to the mass J which would raise the natural frequency of the block J on the pivot 63.

The element 106 as shown in FIG. 3 is a type of clamp element which may be utilized for clamping the rotor housing in position inside of the ring A.

As shown in FIG. 3, the clamping element 106 is threaded into ring A and has a projecting portion which contacts the rotor housing.

On the end of the rotor is provided the rotating disc N as shown in FIG. 8 which has a light reflecting sector 125. The rest of disc N is light absorbing as with flat black paint. The white sector 125 will be illuminated by the bulb P with the light directed in direction 126 and the bulb P will be shielded from the lens system Q and a photo electric tube R. The lens Q as best shown in FIG. 2 is mounted in the phase dial 133 inside of the wall 129 of the unit behind the opening 128 in the electronic unit M.

The photo electric cell R is mounted upon the plate 130 by the socket 131 (see FIG. 2). The photo tube socket 131 and the mounting 131a for the phase dial are carried on the chassis plate 130.

The lens Q will form an image of the disc N in the plane of the opening 134 and from there the light is collected by the cathode 132 of the photo tube R. The sector 135 will blank out light from sector 125 for approximately 180° out of every 360° of rotation of the disc N giving basis for the square curve S of FIGS. 10, 11 and 12 after the signal from the photo tube R has been transmitted to amplifier AA and the square wave generator BB.

This square wave of voltage from the photo tube system will give the base reference. The composite signal curve from the transducers then may be referred to, or compared with the square wave to determine the magnitude and position of the unbalance to be corrected.

The simplified electrical circuit is best shown in FIG. 14. As indicated in FIG. 14 the photo electric tube R has the cathode 132 which will intercept the light reflected from the white sector of the rotating disc N.

The light periodically falling upon cathode 132 of the photo tube R will generate a square wave of voltage, such as shown in FIGS. 10, 11 and 12, which is amplified by the amplifier AA and further squared by the multi-vibrator BB and given a constant amplitude.

The anode voltage for the photo tube is derived from the voltage divider made up of the resistors 153, 154 between the plus source 151 of the D.C. voltage and the ground 152.

The cascaded amplifier AA with the grids 156 and 160 and the plates 157 and 164 and the cathodes 161 amplify the signal at 132. The coupling condenser 155 couples the photo tube R to the amplifier AA.

The coupling condenser 159 is positioned in the circuit 158 in association with the cascaded amplifier AA. The usual resistance connections 162 to the ground 163 are provided at the cascaded amplifier system AA. A multivibrator or square wave generator BB is also provided with the coupling condenser 165, the plates 167 and 169, the grids 166 and 168 and the cathodes 171 and 172.

Referring to FIG. 14, the circuit connection at 170 goes to the speed indicator circuit as shown in the upper right hand corner of FIG. 14. The circuits 173 and 174 lead to the demodulator CC provided with the germanium diode arrangement. At the other side of the galvanometer U there are provided the coupling net work consisting of the condenser 210 and the resistors 211 and 212.

The crystal demodulator circuit including units CC and U will discriminate against or exclude unwanted frequencies from the transducer signal channel, suppressing effect of unwanted signals.

Now, referring to the lower half of the circuit as shown in FIG. 14, the circuit 209 leads from the cascaded A.C. amplifier EE. This amplifier has the plates 206 and 208, the grids 205 and 207 and the coupling condensers 204 together with the cathodes 205a.

The mixer DD consists of two A.C. amplifiers with the common plate load. The amount of the signal taken off at the potentiometer 202 is adjustable depending upon the setting of the potentiometer 202. The mixer DD is connected to the circuits of the transducers G and H.

The setting of the potentiometer adjustment 202 is determined by the moments of inertia, the distance of correction planes from the center of gravity and distance of the dynamic pick-up from the center of gravity.

Referring to the circuits for the transducers G and H the adjustable resistors 191 and 192 will adjust the magnitude of the signal derived from the static transducer G. The transducer G has a single load 402 while the dynamic transducer H has a split load 400 and 401.

The setting of the potentiometers 191 and 192 is determined by the moments of inertia, the distance of the correction planes from the center of gravity, the distance of the dynamic pick-up from the center of gravity and the mass of the rotor plus the housing plus the mount.

The switch 197 associated with the coupling condenser 198 may switch the signals appearing in the circuits 195 and 196 and derived from the cathode and the plate of the transducer H 180° out of phase. The switch 193 may select the signal from either adjustment at 191 or the adjustment at 192, and this selection is for the purpose of measuring the unbalance in opposite planes, for example, at opposite ends of a rotor. The switches 193 and 197 are ganged together.

At points 475 and 476 in FIG. 14, there will appear square waves 475a and 476a of opposite phase or polarity.

Depending upon the polarity at points 475 and 476 either elements 477 and 480 are rendered conducting or elements 478 and 479 are rendered conducting establishing a circuit through to the unbalance meter U.

At circuit connection 209 there will appear a sine wave 209a similar to FIG. 9, generated by mixing the signals from the transducers G and H in the mixer DD and amplifying them in the tube EE.

This sine wave 209a, as shown in FIG. 9, will be of lesser amplitude than the square waves 475a and 476a. The square waves 475a and 476a will be the significant voltage establishing the resistance of the germanium diode crystals 477, 478, 479 and 480.

The reading of unbalance signal will be controlled by the amplitude of the sine wave 209a determining the maximum current flowing through the meter U.

This current flow is also controlled by the relationship of the phase between sine wave 209a and square waves 475a and 476a.

The maximum value of the current will cause the unbalance meter U to give the amount of unbalance.

A unique feature of the present invention is that both static and dynamic unbalance are measured individually and separately by pick-ups G and H at one place or position in the plane passing through center of gravity and perpendicular to spin axis as contrasted to procedures which involve measuring vibrational displacements at other positions on rotor suspensions which give complex functions of combined static and dynamic unbalance.

The present invention in contrast lends itself to a direct indication on an instrument of the amount of mass to be removed in the places of correction by merely throwing the gang switch V controlling the switches 193 and 197 and rotating the phase dial W. The system shown lends itself to production balancing of rotors and eliminates need of complicated calculations or complex manipulations of test equipment and gives reading of high accuracy which are necessary with small high speed gyroscopes and dynamo rotors, turbine rotors, high speed spindles and the like.

The Z-shaped mass J may be positioned horizontally or vertically without effect on the accuracy of the measurements so as to enable balancing of rotors having vertical spin axes with equal facility. The rotors B then may be balanced with their spin axis in normal operating position with the bearings taking up the proper load. In such cases the mounting ring A and scanning arrangement shown at the left of FIG. 8 may be placed so that the longitudinal axis 499 is vertical rather than horizontal, as is shown in FIGS. 16 to 23.

In FIG. 6 the electronic unit M contains both the photoelectric pick up and its associated optical system and the computer circuit.

In the embodiments of FIGS. 16 to 18 the photo electric pick up and its associated optical system is separated from the electronic computer circuit and is mounted in the same assembly with the phase dial 592, the iluminator 597, and the mounting ring 513 together with dynamic and static pick ups.

In the alternative arrangement as shown in FIGS. 16 to 23 there is shown a casing 500 for the air driven turbine 501 which is driven by means of a jet of air indicated by the arrow 502. The air is forced through the tubular connection 503 into the inlet chamber 504 and it impinges upon and drives the rotor 501 at a high rate of velocity.

The casing has a slot as indicated at 505 and a lower continuous peripheral mounting surface 506. The periphery 507 of the mounting surface 506 rests on the shoulders 508 of the adaptor ring 509.

The adaptor ring 509 has the upward extension 510 above the shoulders 508 which receive the clamping set screws 511. The adaptor ring 509 is held in position by the screws 512 upon the mounting ring or annulus 513 which has the opening 514 as shown best in FIG. 18, and also the spaced rubber cup or shock absorber mounts 515, four of these mounts being shown.

The mounts 515 extend downwardly as indicated at 516 to the mounting structure or arms 517. The structure 517 is connected by the foot 518 and the bolt 519 to the upright standard member 520. The upright standard member 520 is carried on the upright support bars 521 and 523 which in turn are mounted on the base support 522.

The support bars 521 and 523 fit into the corner recesses 524 and 525 in the base structure 522. These vertical bars 521 and 523 are held in position by means of the bolts 526 and 527. The base 522 from the top has a triangular shape, as shown in FIG. 17, with the vertical web 528 with the side oblique webs 529 and 530 which are joined together by the curved portion 531.

Below the corner recesses 524 and 525 are positioned the feet 532. The forward curved portion 531 of the base 522 has the forwardly extending step 540 which also receives a foot member 541.

Referring to the right of FIGS. 16 and 18 it will be noted that the ring or annulus 513 has the attachment bolts 542 to the projecting element 543 of the block 544. This block functions the same as the block 37 in FIG. 4. The block 544 connects to the styli of the static and dynamic pickups mounted in the Z-shaped mass 545 which may be of the same construction as the mass J of FIG. 5.

The mass 545 may have the ball pivot bearing 546 of a construction similar to that shown in FIG. 15.

The Z-shaped mass 545 also has an adjustable weight slug 547 and adjustable stops 548 and 549. These stops have the projecting stop portions 550 and 551 which limit the movement of the extension 552 at one end of the Z-shaped block 545.

There are provided the stand off terminals 553 and 554 for the flexible wire connections. The upper end 555 of the tube 561 receives the heavy wires 555a (see FIG. 16) which are also connected to the stand off terminals 553 and 554.

It will be noted that the block 545 is enclosed between the front plate 556 and the rear plate 557 which are connected together by the transverse members 558 and 559. The plate 556 is slotted at 560 to receive the projection 543 of the connecting element 544.

The tubular member 561 which also serves as a heavy wire conduit extends down to the base 522. Referring to the ring 513 as shown in FIG. 18 there are provided the limit stops 562 which limit excursions of the mounting ring or annulus 513.

Within the base there is provided the platform 575 which carries the downwardly extending wall structures 576, 577, 578 and 579 which form a compartment for the photo electric tube 580. The tube 580 has a socket connection 581 and the bulb portion 582 with the photo electric sensitive element 583. This photo sensitive element 583 is positioned directly below the tubular member 584 which carries the lens 585.

The tubular element 584 closely fits within the tubular projection 586 which extends upwardly from the table or platform 575 of the base 522.

The tubular carrier 584 for the lens 585 has a peripheral recess 588. The recess 588 receives the end of the set screw 587 which is mounted in the tubular wall 586 projecting upwardly from the platform 575.

The set screw 587 projects into the recess 588 which prevents vertical movement of the tube 584 while allowing rotation.

The tube 584 is connected to the graduated plate 589 by the screws 590. The plate 589 as shown in FIG. 21 has a serrated or roughened edge as indicated at 592 in FIG. 21.

As shown in FIG. 22 the top peripheral edge 593 of the disc 589 has the markings or graduations 594. Encircling the central tubular bearing element 586 is the outer cylindrical fin element 595 also projecting upwardly from the platform 575. The annular chamber 596 receives the lamp bulbs 597, the light of which passes through the transparent disc 589 as indicated by the arrow 598, to fall upon the light reflecting disc 599. The return illumination will then pass as indicated by the arrow 600 into the tube 584 through the lens 585 and on to the sensitive photo electric element 583.

The bulbs 597 have base portions 610 which extend downwardly through the opening 611 in the platform 575 and are mounted in the base receptacles 612. The base receptacles 612 in turn are supported by the brackets 613, three of these brackets 613, 614 and 615 being shown in FIG. 17.

The lower portion of the lens tube 584 has a cut off or light blanking sector 616. When the tube 584 and the sector 616 are rotated by turning the disc 598, the phase of light striking the photo tube 580 is changed with respect to the rotor position. The disc 599 has the white sector 617 (see FIG. 19) which will be cut off by the light blanking sector 616 during one half of each revolution.

It will be noted that the light blanking sector 616 has a rim extension 618. The sector 616 is held in position by the peened in portions 619 (see FIG. 20).

It will be noted that the relative position of the light blanking sector 616 and the light sector 617 (see FIGS. 19 and 20) may be controlled by varying the position of the graduated disc 589 (see FIGS. 16 and 22). On the side 625 of the upwardly extending cylindrical portion 595 is mounted the block 626 having the index element 627. The block 626 is held in position by means of the screws 628.

The base mounting 581 of the photo electric tube 580 is held in position by pins inserted into the tube socket 633 which has flange 629. The flange 629 is secured to the bracket 630 by screws 630a.

The grommet 631 has an opening 632 for the wires leading from the socket 633 of the photo electric lamp support 580.

The bottom of the enclosure 634, formed by the walls 576, 577, 578 and 579, is closed off by the plate 635 which is held in position by the screws 636 on the lower edge of the walls 576, 577, 578 and 579.

The disc 589 as well as the block 626 may be made of methyl methacrylate or other transparent resins which are transparent and permit passage of light.

The lower oblique portion or wedge portion 645 of the block 626 will cause reflection of the light indicated at 646 upwardly to the periphery of the phase dial 589.

In the base structure 522, as shown in FIG. 17, there is also provided the transformer switch 648 associated with the transformer 647. The wire casing 649 permits the various wire conduits to be readily connected into the interior of the base 522.

The transformer 647 reduces the 110–115 line voltage to the voltage of the lamp and the switch 648 turns the lamps 597 on and off.

In the alternative mounting construction shown in FIG. 23 there is a rotor housing 655 which has a shoulder 656 resting upon the inside peripheral portion 657 of the adaptor ring 658.

The downwardly projecting edges 659 will then rest in the shoulder 660 of the second adaptor ring 661 which is mounted on the annular mounting ring 662'. The set screws or clamping screws 662 and 663 may then be used to clamp the ring 658 in desired position in respect to the ring 661. Two clamping screws 662 and 663 are shown.

It will be noted that the arrangement shown in FIGS. 16 to 23 primarily differs from that shown in FIGS. 1 to 16 in that the axis of rotation of the rotor is vertical instead of horizontal, and the photo electric unit shown in the base 522 is separate and apart from the instrument housing such as shown at the left of FIG. 6 in the first embodiment. Either arrangement may be utilized depending upon the exact position of the rotor which is to be balanced.

In other words, referring to FIG. 6, there has been a separation of the unit M along the dot and dash line 700.

Desirably the wires X, which extend to the Z-shaped block J of FIG. 5, or 545 of FIG. 16, are very flexible and light in weight so as not to place any load upon the block.

In operation the unit of FIGS. 1 to 15 operate substantially the same as the unit of FIGS. 16 to 23.

Both units of FIGS. 1 to 15 and FIGS. 16 to 23 use separate transducers G and H.

The speed switch XX in FIG. 6 enables a change in range of rotational velocity indication, the lowest range being 0 to 2,000, the intermediate range being 0 to 20,000 and the high range being 0 to 200,000.

The sensitivity switch Y in FIG. 6 changes the calibration of the unbalance meter U. The phase adjustor W, which is shown in large scale in FIG. 7, will adjust the phase of the square wave of FIGS. 10, 11, 12 relative to the sine wave from the transducers G and H shown in FIG. 9.

The readings on the unbalance meter U are independent of the speed of the rotation. The use of the transducers G and H eliminates the disadvantages of movable pickups and also eliminates the undesirability of crystals, capacitors, coils or electro-magnetic means, which would have a non-linear frequency response.

It is not necessary to calibrate the meter M for each speed and once the arrangement is calibrated, it will accurately indicate unbalance in meter U at any speed and the change in rotational velocity will not vary the position of unbalance upon the meter U.

A brief synopsis of the theory of operation follows.

An ideal rotor is a rigid system of particles constrained to rotate about an axis defined by two or more bearing elements located on a single, straight line. This line, as shown in FIG. 24, is a principal axis or spin axis 800 of the rotor 801. Associated with the principal axis is the principal plane 802 perpendicular to it, passing through the center of mass.

If the sum of internal forces arising from rotation of the rotor 801 imposes zero force upon the bearing elements, the rotor 801 is said to be balanced. The bearings, even if free in space, would experience no displacement under these circumstances.

If a small mass $m_s$ is added to the balanced rotor 801 at a point 803 (away from the center of mass) in the principal plane 802, the rotor will attempt to rotate about a new axis 804.

If the bearings are free in space, the principal axis 800 will sweep out a circular cylinder whose longitudinal axis is parallel to the principal axis 800. This condition will be referred to as static unbalance, and is shown in FIG. 24.

If two small equal masses 805 are added to the balanced rotor 801 at points equidistant from and on a line through the center of mass (but not on the principal axis 801 nor in the principal plane 802), the rotor 801 will attempt to rotate about an axis 800 intersecting the center of mass and angularly displaced from the principal axis 806. If the bearings are free in space, the principal axis 806 will sweep out a cone whose apex is the center of mass. This condition is referred to as dynamic unbalance, as shown in FIG. 25.

In general, unbalance may consist of both static and dynamic unbalance in combination. In this event, the surface swept out by the principal axis is a composite of the cylinder and the cone.

The total unbalance of the rotor may be resolved into two masses, $m_1$ and $m_2$ located in two planes on opposite sides of the center of mass or gravity and perpendicular to the spin axis, as shown in FIGS. 26 and 27. In the general case, the masses will be unequal and located at different angular displacements about the spin axis measured from some arbitrary reference point as shown in FIG. 27.

The masses $m_1$ and $m_2$ separately would produce the static and dynamic displacements having the values tabulated below:

| Plane | Unbalance | Static Displacement | Dynamic Displacement |
| --- | --- | --- | --- |
| 1 | $m_1 r_1 e^{j\phi_1}$ | $\frac{m_1 r_1}{M} e^{j\phi_1}$ | $\frac{m_1 r_1 a_1}{I_x - I_y} e^{j\phi_1}$ |
| 2 | $m_2 r_2 e^{j\phi_2}$ | $\frac{m_2 r_2}{M} e^{j\varphi_2}$ | $\frac{m_2 r_2 a_2}{I_x - I_y} e^{j\phi_2}$ |

The various symbols used in the following discussion are defined below:

$m_1$—unbalance mass in first correction plane.
$m_2$—unbalance mass in second correction plane.
$r_1$—distance of $m_1$ from spin axis.
$r_2$—distance of $m_2$ from spin axis.
$a_1$—distance of first plane from center of gravity.
$a_2$—distance of second plane from center of gravity.
$\phi_1$—angular displacement of $m_1$ about the spin axis measured from a reference point.
$\phi_2$—angular displacement of $m_2$ from the same reference point.
$I_x$—moment of inertia of the rotor about its spin axis.
$I_y$—moment of inertia of rotor about an axis at right angles to the spin axis and passing through the center of gravity (includes mounting facilities).
$M$—mass of the rotor.
$\overline{D}$—the complex displacement of a point on the axis which passes through the center of gravity and is perpendicular to the spin axis; located a distance $c$ from the center of gravity. This displacement is a measure of the dynamic unbalance.
$\overline{S}$—the complex displacement of the center of gravity of the rotor measured at right angles to the spin axis. This displacement is a measure of the static unbalance.
$e$—natural logarithmic base.
$j$—square root of minus one.
$c$—the constant of the balancing apparatus specifically the distance from the center of gravity to pickup point.
$\delta$ is the angle of displacement of the geometrical axis with respect to the spin axis of the dynamically unbalanced rotor.
$m$ is an added mass which gives dynamic unbalance.
$m_s$ is an added mass which gives static unbalance.
$\overline{d}_3, \overline{d}_4$—complex displacements measured in two different planes perpendicular to the principal axis and removed from the center of mass, $d_3$, $d_4$ include information as to phase angle as well as magnitude.
$x$—principal axis of the balanced rotor.
$x_1$—principal axis of the unbalanced rotor.
$y$—principal plane perpendicular to the principal axis extending through the center of mass or gravity.
$x_3$—distance from the center of mass to the plane at which displacement $d_3$ is measured.
$x_4$—distance from the center of mass at which displacement $d_4$ is measured.

The unbalanced masses are related to the displacements of the spinning rotor in the following manner:

*Equation No. 1*

$$m_1 r_1 e^{j\phi_1} = \frac{(I_x - I_y) + x_4 a_2 M}{x_3 a_1 + x_4 a_2 - x_3 a_2 - x_4 a_1} \overline{d}_3 - \frac{(I_x - I_y) + x_3 a_2 M}{x_3 a_1 + x_4 a_2 - x_3 a_2 - x_4 a_1} \overline{d}_4$$

*Equation No. 2*

$$m_2 r_2 e^{j\phi_2} = \frac{(I_x - I_y) + x_4 a_1 M}{x_3 a_1 + x_4 a_2 - x_3 a_2 - x_4 a_1} \overline{d}_3 + \frac{(I_x - I_y) + x_3 a_1 M}{x_3 a_1 + x_4 a_2 - x_3 a_2 - x_4 a_1} \overline{d}_4$$

Equations No. 1 and No. 2 may be simplified by selecting unique planes in which to measure the displacements $d_3$ and $d_4$. These planes are located by letting $x_3$ equal zero and permitting $x_4$ to become infinitely large.

The simplified equations will be as follows:

*Equation No. 3*

$$m_1 r_1 e^{j\phi_1} = \frac{a_2 M}{a_2 - a_1} \overline{S} - \frac{(I_x - I_y)}{c(a_2 - a_1)} \overline{D}$$

*Equation No. 4*

$$m_2 r_2 e^{j\phi_2} = \frac{-a_1 M}{a_2 - a_1} \overline{S} + \frac{(I_x - I_y)}{c(a_2 - a_1)} \overline{D}$$

The expression above may be further simplified to give the following equations:

*Equation No. 5*

$$m_1 r_1 e^{j\phi_1} = A(B\overline{S} - \overline{D})$$

*Equation No. 6*

$$m_2 r_2 e^{j\phi_2} = A(-C\overline{S} + \overline{D})$$

where $$A = \frac{I_x - I_y}{c(a_2 - a_1)}$$

$$B = \frac{a_2 cM}{I_x - I_y}$$

$$C = \frac{a_1 cM}{I_x - I_y}$$

These equations may be solved by electrical means to give the values of $m_1 r_1$ and $m_2 r_2$. The form of circuit will be determined by the right-hand side of the Equations Nos. 5 and 6, with the multiplication $B\overline{S}$ and $C\overline{S}$ being performed by potentiometers 191 and 192 and the addition of $B\overline{S} - \overline{D}$ and $-C\overline{S} + \overline{D}$ taking place in a mixer tube DD.

Further multiplication of A times $(B\overline{S} - \overline{D})$ and A times $(-C\overline{S} + \overline{D})$ may be performed by a third potentiometer 202.

To obtain either plus or minus values of $\overline{D}$, it is feasible to provide the switch 197 to take signals of opposite sign from the cathode 451 and the plate 450 of the transducer H utilized. A second switch 193—ganged with said first switch 197—will select the multiplier B or C, depending upon whether Equation 5 or 6 is being solved.

The plate currents of the mechano-electronic transducers G and H will correspond to the mechanical displacements of the plates 450 and 453. These transducers G and H are employed to convert the displacements $\overline{D}$ and $\overline{S}$ into directly proportional electrical signals.

The transducers G and H and their actuating connections are so arranged that they will not be affected by any vibrational components which they are not to measure.

The load impedance of transducer H is divided between plate 450 and cathode 451 so that it produces signals proportional to plus and minus $\overline{D}$ by virtue of the 180° phase difference between the voltage at the plate 450 and cathode 451.

Potentiometers 191 and 192 are provided to adjust the magnitude of the signal from transducer G to correspond to the magnitude of the terms $B\overline{S}$ and $C\overline{S}$ in Equations Nos. 5 and 6.

The signals from transducers G and H are amplified by the mixer DD and added by means of the common plate impedance of the two plates 200 and 201. The gang switch V selects the appropriate signals from transducers G and H to yield the solution to either Equation No. 5 or No. 6.

The amplitude of the signal appearing at the plates 200 and 201 may be modified by means of potentiometer 202 to make it proportional to the magnitude of the right-hand side of Equations No. 5 or No. 6. The signal at this point then is directly a measure of the unbalance in either plane 1 or 2, depending upon the position of switch V.

The amplitude and phase of the signal from amplifier DD after suitable amplification is measured by the upper part of the circuit shown in FIG. 14.

The signal from the mixer DD after amplification by the amplifier DD is applied to the crystal diode demodulator network CC. The reference signal for this demodulator is obtained from the cathodes 171 and 172 of multivibrator BB, which produces a square wave 475a or 476a whose frequency and phase are those of a light signal falling upon photo tube R.

The light signal is obtained from a reflective surface N on the spinning rotor B. The frequency of the light signal is that of the spinning rotor B and the phase of the signal with respect to the unbalance signals may be changed by rotating the light blanking sector 135, which is located between the rotor B and the photo tube R.

The current through the unbalance meter U is directly proportional to the unbalance $m_1 r_1 e^{\phi_1}$ or $m_1 r_1 e^{\phi_2}$.

When the phase of the light signal is adjusted so that the reference voltage to the demodulator CC is in phase with the unbalance signal from DD as shown in FIG. 10, the meter U will read a maximum.

When the phase relationship between the signals is, as shown in FIG. 12, the meter U reads zero. By proper calibration of the instrument, these meter indications, as shown in FIGS. 10 to 12, are made to yield the position and magnitude of the unbalance of the spinning rotor B.

The position of the needle or indicator in the unbalance meter U is restored to zero position of FIG. 12 by rotating the phase dial W, and the reading at index 495 in FIG. 6 or index 627 in FIG. 21 is an indication of the relative phase of the unbalance with respect to the reference square wave in the circuitry. This reading will give the values of $\phi_1$ or $\phi_2$, depending upon the position of switch V.

The maximum swing of the needle of the meter U will give the product $m_1 r_1$ or $m_2 r_2$, which is product of unbalance mass times distance from spin axis. Since the value of $r_1$ and $r_2$ are already predetermined, therefore the value of $m_1$ or $m_2$ to be drilled out may be readily determined.

The present invention is particularly distinctive in that the electric signals generated by the transducers G and H of FIGS. 5 and 8 will not be affected by the rotational speed of the rotor B but will solely be affected by the displacement which is transmitted from the rotor B to the ring A and then through extension 37 to the connections 42 and 43. These connections 42 and 43, which are at right angles to each other, will vary the position of the plate inside of the tube G or H in respect to the grid of said tube to give a displacement signal.

These displacement signals, as shown in the circuitry of FIG. 14, will be modified before or at the left of gang switch V of FIG. 14 so that signals modified in a predetermined portion may be combined to give a single correction in planes on each side of the center of gravity of the rotor, which single correction will correct for both static unbalance and dynamic unbalance.

For example, the dynamic signals coming from the tube H may be reversed in phase by 180° with respect to the original signal, and the static signal may be changed in amplitude by a potentiometer 191 or 192, and these modified signals may then be combined to give the correction in one plane. When the switch V is thrown to another position it will pick up the original dynamic signal which is not reversed in phase and also will pick the static signal which has now been adjusted in amplitude by the other potentiometer, whether it be 191 or 192, and this will give the correction in the other plane on the opposite side of the center of gravity, which again is a single correction in this plane to correct for both static and dynamic unbalance.

Since the system is a displacement system, sensitive only to displacement and not to rotational velocity of the rotor, it is important that the system be able to find a displacement zero regardless of the type or character of the rotor, which may be tested for unbalance inside of the ring A.

In FIG. 8 there is shown shock mounts C, which may in the specific disclosure take the form of rubber cup mountings, as indicated in FIG. 3. These mountings will have the effect of suspending the rotor free in space within the ring A so that its small movements, due to unbalance, will not be affected or modified by the mounting of the ring A upon the structural standard or mounting structure D of FIG. 2. Similarly the transducers G and H will find their displacement position zero since the movable plate 95 will be held in zero displacement position by the thin resilient enclosure or membrane 96 in combination with the specially mounted Z-block J shown in FIG. 5 and also in small scale in FIGS. 2 and 3 within the base of the rotor balance. This Z-block J either has the pivot mounting indicated at 63a and 63b in FIG. 2 or the ball pivot mounting 30 as indicated in FIG. 15.

The mass of the block J is such that it will not at all be affected by the small displacements applied to the styluses 97 and the plates 95, as indicated in FIG. 15. Rather, the block J will assume a position in space at which the displacement of the plates 95 will be zero. It is from this zero position that the plates 95 of FIG. 13, and 450 and 453 of FIG. 14 will move a predetermined amplitude on each side of their zero position and it is this amplitude that determines the signal which is created by the dynamic tube H and the static tube G. The displacement and not the speed of movement of the plate is what determines the signal which is generated.

Then by combining two modified and/or unmodified signals, one from the static tube G and the other from the dynamic tube H, it is possible by switching the gang switch V first to find the correction at one plane on one side of the rotor, and then in another plane on the other side of the rotor.

As many changes could be made in the above rotor balancer, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. In a rotor balancer to determine the correction to be made to correct for dynamic and static unbalance of a rotor, a supporting structure, said structure including a base, a transverse supporting bar extending outwardly perpendicularly from the base, a mounting ring mounted on the upper end of said bar, elastic mounts for said ring on said bar so that it may vibrate freely in respect to said bar, the rotational speed of the rotor being many times the natural resonant frequency of the elastic mounts said mounting ring having means to carry the rotor, said base including a mounting block pivotally mounted on said base, electro-mechanical transducers mounted in said block to convert the mechanical displacements due to static and dynamic unbalance into separate electrical signals, a transmission extending transversely to the axis of rotation of the rotor from said mounting ring to the transducers to transmit to the transducers displacements of the ring resulting from static and dynamic unbalance of the rotor, and a computer circuit to receive information from said transducers and to compute corrections to be made to eliminate unbalance.

2. The supporting structure of claim 1, said structure being provided with a photo electric pick up system to provide phase and speed measurements of said rotor.

3. The supporting structure of claim 1, said circuit having circuitry to receive said information and to determine the phase of the rotor and to compare said phase with said information to yield without calculation corrections to be made at points located in two correction planes at predetermined distances from the center of gravity.

4. In a displacement sensitive, rotational-speed-insensitive rotor balancer for determining changes in an unbalanced high speed rotor to be made in two different planes transverse to the rotor axis on opposite sides of the center of gravity at a single point in each plane to correct for both static and dynamic unbalance of the type having a support structure, a rotor carrying structure supported by and from said support structure, flexible movable connection supports for said carrying structure upon said support structure to hold said rotor free in space so that it may move freely due to static and dynamic unbalance without clamping when spinning on its axis, the rotational speed of the rotor being many times the natural resonant frequency of supports, said structure having a zero displacement location and creating a signal when moved through an amplitude generated by the amplitude of movement of rotor due to static and dynamic unbalance, and being not affected by the speed of movement through the amplitude and being not affected by rotational speed of the rotor; the combination therewith of an electronic computer for a rotor balancer circuit comprising electro-mechanical transducers having moving parts to convert mechanical displacements resulting from dynamic and static unbalance into out-going electrical signals, potentiometers connected to the transducers to modify the signals of said transducers, a mixer tube for adding the signals from the transducers, a potentiometer electrically connected to the mixer tube for modifying the sum of the signals, and circuit means to measure the magnitude and phase of the modified sum from the mixer tube and means to provide a phase reference signal and means to combine said reference signal and said modified sum into a signal indicative of the corrections to be made in said rotor there being transmission means from the rotor carrying structure to the transducers.

5. In the computer of claim 4, a gang switch arrangement electrically connected to transducers to enable determination of the corrections to be made at points in different planes to correct for static and dynamic unbalance.

6. A rotor balancer comprising a base structure, two electro-mechanical sensing devices sensitive to frequencies encountered in balancing for sensing the dynamic unbalance and for sensing the static unbalance of the rotor and producing electrical static and dynamic unbalance signals, independently of the speed of the rotor, said dynamic unbalance of the rotor causing an angular displacement of the geometric axis of the rotor about its center of gravity and said static unbalance causing a lateral displacement of the geometric axis of the rotor, sensing device carrier means for said sensing devices mounted to move in respect to said base structure, said sensing device carrier having substantially no tendency to oscillate at frequencies encountered in balancing, a second carrier for the rotor upon which the rotor may be mounted, said second carrier having mountings upon the base structure which permits the rotor to oscillate freely in response to the static and dynamic unbalance, said rotor being mounted upon said second carrier so as to transmit to said second carrier oscillations due to the static and dynamic unbalance, transmission means to transfer said oscillations to said sensing devices, and a computer circuit to receive electrical information as to said static and dynamic unbalance as a result of said displacements and to provide signals indicative of the corrections to be made at points located in two correction planes at predetermined distances from the center of gravity.

7. The balancer of claim 6, said transmission means being located and extending from the second carrier toward the sensing devices substantially in the plane of the center of gravity of the rotor.

8. The balancer of claim 6, the rotor associated therewith being provided with a reference marking mounted to rotate with the rotor, said balancer including a photoelectric cell mounted to be energized by the light reflected from the reference marking, and adjustable means to interrupt once per rotor revolution the light passing from the reference marking to the photo-electric cell, the interruption producing a signal synchronous with unbalance signals and the adjustment of the adjustable means varying the phase of signal derived at the photoelectric cell in respect to the unbalance signals.

9. The balancer of claim 6, said sensing means consisting of displacement sensitive electron tube transducers having movable plate elements with external connections to move the same and create a change in current passing through the tube and said transmission means including displacement transmitting connections from the transmission means to said external connections at right angles to each other, one connection being oriented and extending in the direction of the transmission means and the other transmission connection being parallel to the axis of rotation and at right angles to the transmission means.

10. An electronic measuring circuitry system associated with a rotor balancer for determining the corrections to be made to minimize the oscillations arising from static and dynamic unbalance, independently of the speed of the rotor, comprising electro-mechanical thermionic transducer tubes to generate dynamic unbalance signals and static unbalance signals, which signals are supplied to said system, said system including variable potentiometers and mixer and amplifier thermionic tubes to modify and combine said unbalance signals, an electrical phase reference signal generator, a comparator to compare the combined signals with the phase reference signal, said combined signals being related to the magnitude and phase of the corrections to be made and switching means to enable determination of two corrections to be made in the rotor to reduce both the static and dynamic unbalance.

11. In a displacement sensitive, rotational-speed-insensitive rotor balancer for determining changes in an unbalanced high speed rotor to be made in two different planes transverse to the rotor axis on opposite sides of the center of gravity at a single point in each plane to correct for both static and dynamic unbalance of the type having a support structure, a rotor carrying structure supported by and from said support structure, flexible movable connection supports for said carrying structure upon said support structure to hold said rotor free in space so that it may move freely due to static and dynamic unbalance without clamping when spinning on its axis, the rotational speed of the rotor being many times the natural resonant frequency of the supports, said structure having a zero displacement location and creating a signal when moved through an amplitude generated by the amplitude of movement of rotor due to static and dynamic unbalance, and being not affected by the speed of movement through the amplitude and being not affected by rotational speed of the rotor; the combination therewith of a circuitry system for determining corrections to be made in a rotor to be corrected for static and dynamic unbalance independently of the speed of the rotor, in which the system determines the corrections to be made to eliminate the displacements corresponding to static and dynamic unbalance and the corrections which may be made in any two selected planes, said planes extending through the rotor and perpendicular to the rotor axis, said mathematical relationship being as follows:

$$\overline{U}_1 = C(\overline{AS} - \overline{D})$$
$$\overline{U}_2 = C(\overline{BS} + \overline{D})$$

where $U_1$ and $U_2$ are the corrections, A, B and C are constants depending upon the configuration of the rotor and S and D respectively represent the displacements arising from static and dynamic unbalance and the bar over U, S and D indicates that these quantities are vectorial, said system including electro-mechanical thermionic transducer tubes to give electrical phase signals, static unbalance signals and dynamic unbalance signals, which correspond respectively to phase, static unbalance and dynamic unbalance, variable resistances to modify S and D in the manner above indicated by the values of A, B and C, switching means to modify the circuitry to yield solution to either the first or the second equations above, and a comparator including meter to indicate the magnitude and phase of the corrections, said comparator comparing the phase of $U_1$ and $U_2$ in respect to the phase reference signal, and a photo-tube associated in series with an amplifier, a square wave generator and a demodulator to supply said phase reference signal said structure having transmissions to said transducer tubes.

12. A displacement sensitive, rotational-speed-insensitive rotor balancer for determining changes in an unbalanced high speed rotor to be made in two different planes transverse to the rotor axis on opposite sides of the center of gravity at a single point in each plane to correct for both static and dynamic unbalance comprising a support structure, a rotor carrying structure supported by and from said support structure, flexible movable connection supports for said carrying structure upon said support structure to hold said rotor free in space so that it may move freely due to static and dynamic unbalance without clamping when spinning on its axis, the rotational speed of the rotor being many times the natural resonant frequency of the supports, displacement sensitive transducers mounted at the carrying structure having zero displacement locations and creating a signal when moved through an amplitude generated by the amplitude of movement of rotor due to static and dynamic unbalance, and not affected by the speed of movement through the amplitude and not affected by rotational speed of the rotor, separate connections from said carrying structure to said transducers to transmit displacement due only to static unbalance to one transducer and due only to dynamic unbalance to the other transducer, circuitry for receiving, modifying and transmitting said signals to provide two sets of dynamic and static unbalance signals, one set of static and dynamic unbalance signals for combination to give a single correction for both static and dynamic unbalance on one of said planes and another set of static and dynamic unbalance signals to give a single correction in the other plane, a mixer for combining each set of signals, a photocell system to generate an electrical phase reference signal, an unbalance meter selectively receiving one of said combined sets of signals and said electrical phase reference signal and giving the correction to be made in said respective plane.

13. The balancer of claim 12, said transducers consisting of vacuum tubes having movable plate elements and outwardly projecting styluses actuated by unbalance displacement of the spinning rotor.

14. The balancer of claim 12, a pivotally mounted support mass for said transducers mounted on the supporting structure and free to oscillate and move in space to permit said transducers always to assume a position of zero displacement.

15. The balancer of claim 12, a ring mount encircling said rotor at the plane of the center of gravity thereof, an extension from one side of said ring in said plane and transmitting wires from the end of the extension to the transducers located partially at right angles to each other and partially in a plane parallel to the rotor axis and having their connections to the extension located at the plane of the center of gravity.

16. A rotational-speed-insensitive rotor balancer having a support for a rotating unbalanced rotor, support connections to hold the rotor freely in space so that it may be displaced by the unbalance without damping or friction due to the support, the rotational speed of the rotor being many times the natural resonant frequency of the supports, position zero transducers, one to measure only static unbalance and the other to measure only dynamic unbalance, connections from the rotor to the transducers at least in part at right angles to transmit to the transducers the displacement of the rotor due to unbalance independent of rotational speed of the rotor, and a support for the transducers to permit the transducers to find a zero displacement position, said support being movable in space in respect to the support.

17. The transducer of claim 16, in which said transducers consisting of movable plate thermionic tubes and the initial ends of connections to said plates to transmit displacement thereto are located in the plane of the center of gravity of the rotor.

18. A method of correcting unbalance in rotors, while holding the rotors in a holder arrangement wherever the rotational speed is many times the natural resonant frequency of the holder arrangement, which comprises first measuring only the linear unbalance displacement in the plane of the center of gravity separately and independently of the speed of rotation to obtain an electrical signal solely affected by said displacement and by no other displacement and the angular unbalance displacement of the spin axis separately and independently of the speed of rotation to obtain an electrical signal solely affected by said displacement and by no other displacement and in so measuring transferring the small displacement due to static and dynamic unbalance simultaneously from the rotor to points in a plane perpendicular to the spin axis of the unbalanced rotor and extending through the center of gravity of said unbalanced rotor, which points are substantially spaced away from the spin axis, then electrically converting these measurements into corrections to be made to correct the balance in the rotor at points in two correction planes at predetermined distances from the center of gravity, said conversion being accomplished by electrical computation, said electrical conversion consisting in converting said displacement into separate electrical signals for static unbalance and for dynamic unbalance, combining and modifying said electrical signals in accordance with the configuration, mass and inertia of the rotor, two electrical signals being provided which respectively will give the correction to be made in each of two selected planes to correct for the unbalance in the rotor.

19. Apparatus to determine the correction to be made in two different correction planes to correct for the static and dynamic unbalance in a spinning rotor which comprises a mounting ring receiving and encircling the rotor stator combination, a single transmission extending transversely to the axis of the rotor outwardly from the edge of said ring to carry displacements due to static and dynamic unbalance, a resilient mounting for said ring so that it may vibrate freely in response to such unbalance, the rotational speed of the rotor being many times the natural resonant frequency of the resilient mounting, and means to measure both said static and dynamic unbalance in one operation and transducers positioned to one side of said rotor to measure the static and dynamic unbalance simultaneously, said ring at one side thereof having said single transmission and then in turn a pair of connections from said single transmission at right angles to each other, one connection transmitting only displacements due to dynamic unbalance and the other transmitting displacements arising only from static unbalance, independent of the rotary speed, to said measuring means, and a computer circuit actuated by said pair of connections to give the corrections at points located in two correction planes to correct balance.

20. Apparatus to determine the correction to be made in two different correction planes to correct for the static and dynamic unbalance in a spinning rotor which comprises a mounting ring receiving and encircling the rotor-stator combination, a single transmission extending transversely to the axis of the rotor outwardly from the edge of said ring to carry displacements due to static and dynamic unbalance, a resilient mounting for said ring so that the ring mounting may vibrate freely in response to such unbalance, the rotational speed of the rotor being many times the natural resonant frequency of the resilient mounting, and means to measure both said static and dynamic unbalance in one operation, and means to measure said displacements resulting from said unbalance and a computer including combining switches and comparator means to compute the correction to be made to correct the unbalance in said first mentioned different planes, said ring at one side thereof having said single transmission and then in sequence a pair of connections from said single transmission at right angles to each other, one connection transmitting only displacements due to dynamic unbalance and the other transmitting displacements arising only from static unbalance, independent of the rotary speed, to said measuring means, said computer circuit being actuated by said pair of connections.

21. Apparatus to determine the correction to be made in two different correction planes to correct for the static and dynamic unbalance in a spinning rotor, which comprises a mounting ring receiving and encircling the rotor-stator combination, a single transmission extending transversely to the axis of the rotor outwardly from the edge of said ring to carry displacements due to static and dynamic unbalance, a resilient mounting for said ring so that it may vibrate freely in response to such unbalance, the rotational speed of the rotor being many times the natural resonant frequency of the resilient mounting, and means to measure both said static and dynamic unbalance in one operation and an electrical transducer computer circuit including transducer movable plate tubes and a switching arrangement to combine the signals from said tubes to measure the static and dynamic unbalance and to compute the correction to be made in said different planes, said ring at one side thereof having said single transmission and then in sequence a pair of connections from said single transmission at right angles to each other, one connection transmitting only displacements due to dynamic unbalance and the other transmitting displacements arising only from static unbalance, independent of the rotary speed, to said measuring means, said computer circuit being actuated by said pair of connections.

22. A displacement sensitive, rotational-speed-insensitive rotor balancer for determining changes in an unbalanced high speed rotor to be made in two different planes transverse to the rotor axis on opposite sides of the center of gravity at a single point in each plane to correct for both static and dynamic unbalance in a rotor, said balancer having a mounting member to mount said rotor, resilient mounts and supports for said mounting member to permit mechanical displacements of said mounting member solely due to movement of the rotor due to said unbalance, transducer means to receive said mechanical displacements and convert them into electrical signals, floating means for mounting said transducers which is insensitive to and does not respond to said mechanical displacements and a transmission from said mounting member to said transducer means to transmit said mechanical displacements to said transducer means, and a computer circuit to receive electrical information as to said static and dynamic unbalance as a result of said displacements and to provide signals indicative of the corrections to be made at points located in two correction planes at predetermined distances from the center of gravity, said mounting member serving to hold said rotor free in space so that it may move freely due to static and dynamic unbalance without damping when spinning on its axis, the rotational speed of the rotor being many times the natural resonant frequency of the supports, said mounts and supports having a zero displacement location and creating a signal when moved through an amplitude generated by the movement of rotor due to static and dynamic unbalance, and being not affected by the speed of movement through the amplitude and being not affected by rotational speed of the rotor.

References Cited in the file of this patent

UNITED STATES PATENTS

| | | |
|---|---|---|
| 2,043,845 | Thearle | June 9, 1936 |
| 2,131,602 | Thearle | Sept. 27, 1938 |
| 2,405,430 | Kent | Aug. 6, 1946 |
| 2,451,863 | Oakley | Oct. 19, 1948 |
| 2,565,577 | Schnoebelen | Aug. 28, 1951 |
| 2,616,289 | Kleckner | Nov. 4, 1952 |

FOREIGN PATENTS

| | | |
|---|---|---|
| 612,357 | Great Britain | Nov. 11, 1948 |

OTHER REFERENCES

"Strain Gages," by D. M. Nielsen, published in Electronics issue December 1943. This article is cited because of the phase sensitive rectifier bridge shown therein 73–88.5.